Aug. 7, 1962 W. D. GREEN, JR., ETAL 3,048,270

METHOD OF AND APPARATUS FOR COLOR CLASSIFICATION

Filed Nov. 8, 1960 8 Sheets-Sheet 1

INVENTORS
WILLIAM D. GREEN JR.
ROBERT P. BARTLETT
BY
William R. Liberman
ATTORNEY

METHOD OF AND APPARATUS FOR COLOR CLASSIFICATION

Filed Nov. 8, 1960

INVENTORS
WILLIAM D. GREEN JR.
ROBERT P. BARTLETT
BY
William R. Liberman
ATTORNEY Aug. 7, 1962 W. D. GREEN, JR., ET AL 3,048,270

METHOD OF AND APPARATUS FOR COLOR CLASSIFICATION

Filed Nov. 8, 1960 8 Sheets-Sheet 3

INVENTORS
WILLIAM D. GREEN JR.
ROBERT P. BARTLETT
BY
William R. Liberman
ATTORNEY

METHOD OF AND APPARATUS FOR COLOR CLASSIFICATION

Filed Nov. 8, 1960 8 Sheets-Sheet 4

INVENTORS
WILLIAM D. GREEN JR.
ROBERT P. BARTLETT
BY
William R. Liberman
ATTORNEY INVENTORS
WILLIAM D. GREEN JR.
ROBERT P. BARTLETT
BY
William R. Liberman
ATTORNEY

METHOD OF AND APPARATUS FOR COLOR CLASSIFICATION

INVENTORS
WILLIAM D. GREEN JR.
ROBERT P. BARTLETT
BY
William R. Liberman
ATTORNEY INVENTORS
WILLIAM D. GREEN JR.
ROBERT P. BARTLETT
BY
William R. Liberman
ATTORNEY INVENTORS
WILLIAM D. GREEN JR.
ROBERT P. BARTLETT
BY
William R. Liberman
ATTORNEY United States Patent Office 3,048,270

Patented Aug. 7, 1962

3,048,270

METHOD OF AND APPARATUS FOR COLOR CLASSIFICATION

William D. Green, Jr., Concord, and Robert P. Bartlett, Belmont, Mass., assignors to Consolidated Cigar Corporation, New York, N.Y., a corporation of Delaware Filed Nov. 8, 1960, Ser. No. 67,936
25 Claims. (Cl. 209—111.5)

The present invention relates generally to improvements in the measurement of color, and in particular it relates to an improved apparatus and method for classifying and sorting—among other things—cigars in accordance with their colors.

In the packaging of cigars for sale to the ultimate consumer, it is highly desirable and a practice of long standing to place into a unit package or box cigars which are similar in color, thereby to produce an attractive and pleasing appearance. Heretofore, cigars have been visually inspected and manually separated into groups in accordance with the colors and shades of the cigars. As is readily understandable, this method of sorting and classifying cigars is tedious, laborious, time-consuming and expensive since highly-skilled operators are required. The end result is all too-often unsatisfactory since the color classification operation, not only as applied to cigars but also as regards other articles or materials, is subjective and so the results vary from individual sorter to sorter and with the individual sorter from day to day and even during the day as fatigue sets in.

It is, therefore, a principal object of the present invention to provide an improved color measuring apparatus and method.

Another object of the present invention is to provide an improved apparatus and method for the automatic classification and sorting of objects in accordance with their colors.

A further object of the present invention is to provide an improved apparatus of the above nature characterized by its high rate of speed, high sensitivity, accuracy and degree of resolution as well as its high flexibility and versatility.

The above and other objects of the present invention will become apparent from a reading of the following description taken in conjunction with the accompanying drawings wherein.

Figure 1:
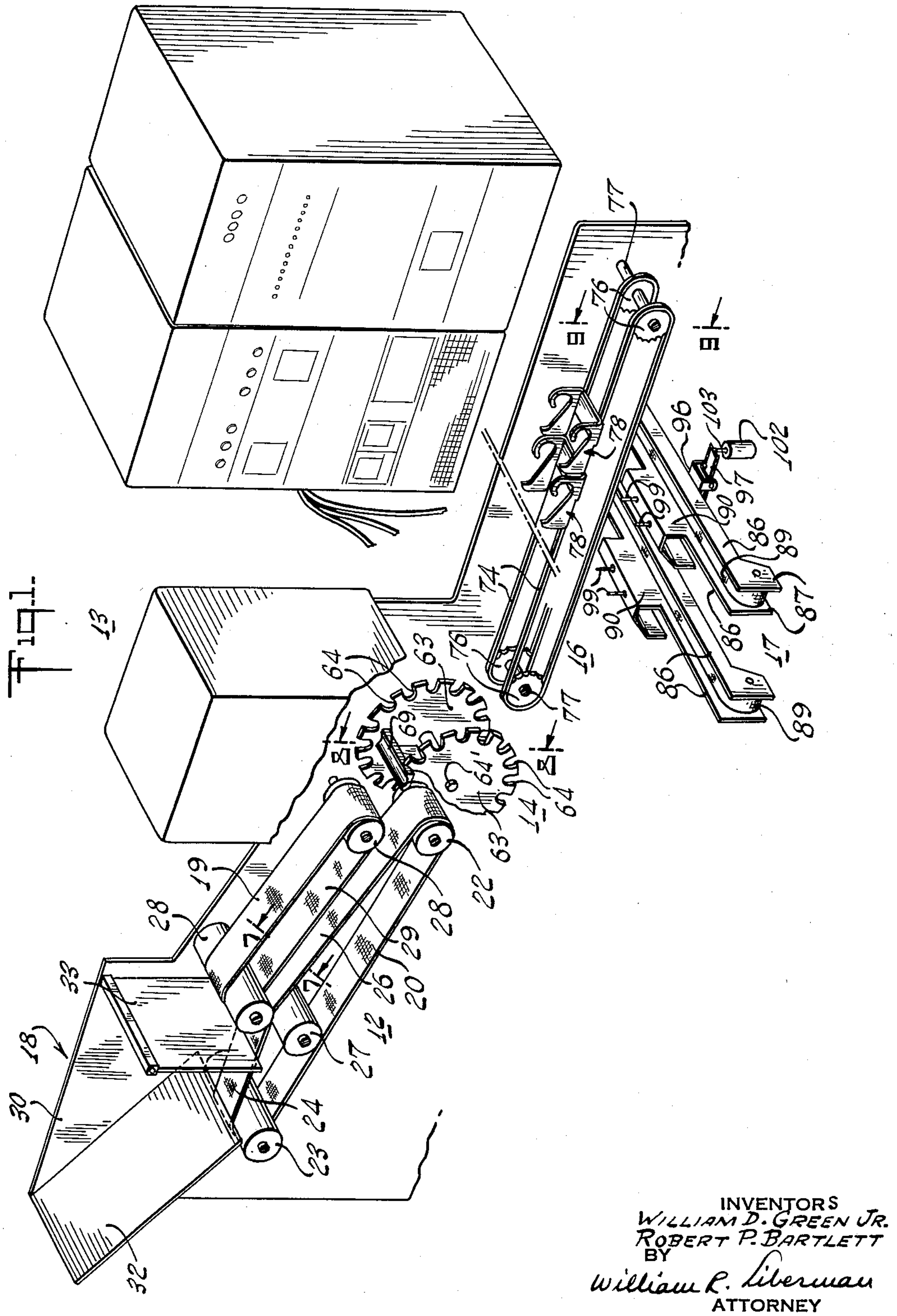
FIGURE 1 is a perspective view of a cigar color classifying apparatus embodying the present invention and illustrated partially broken away.
Figures 2, 4:
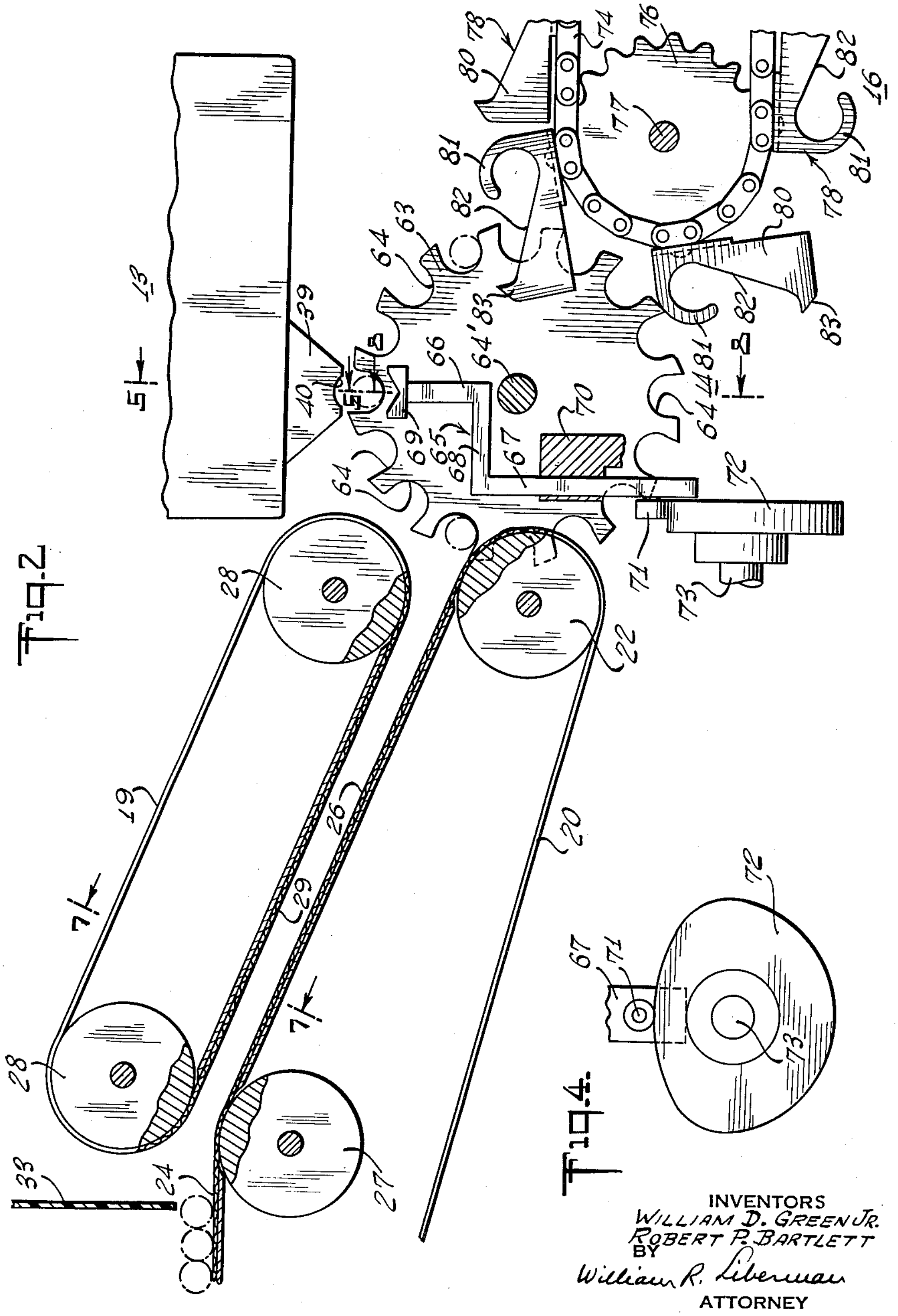
FIGURE 2 is an enlarged detailed front elevational view of a portion of the cigar-handling mechanism.
FIGURE 4 is a side elevational view of the cigar inspection raising cam.
Figure 3:
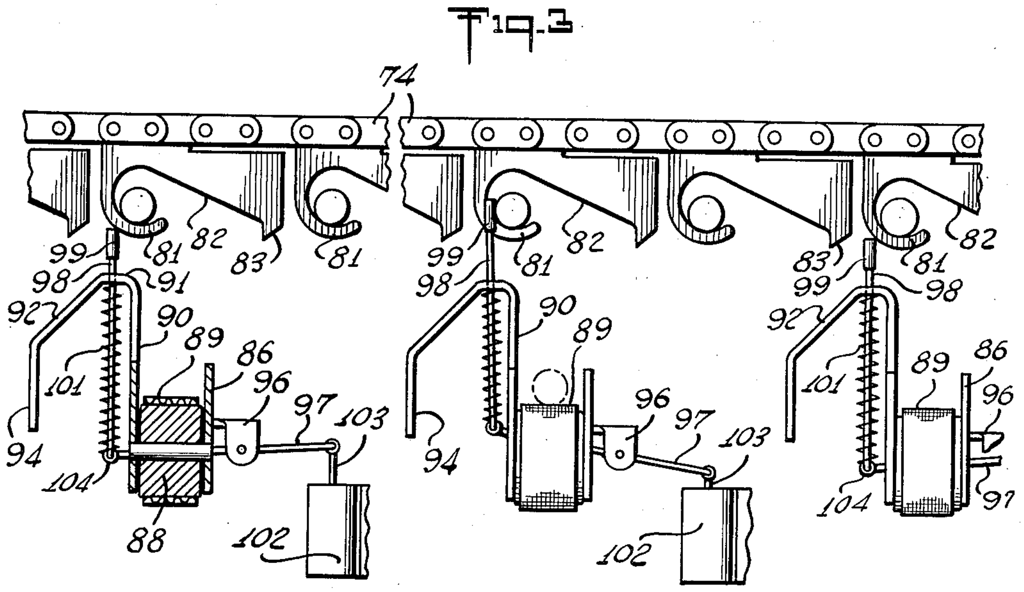
FIGURE 3 is a front elevational view, partially broken away, of the cigar distributing conveyor, cigar ejectors and discharge conveyors.
Figures 7, 8:
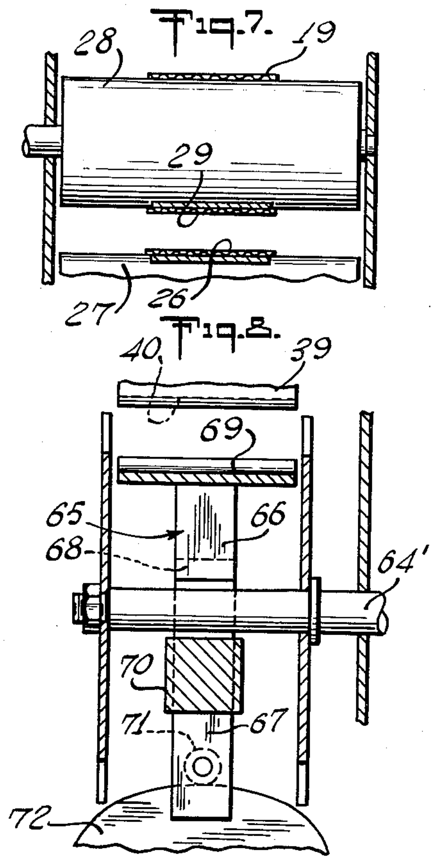
FIGURE 7 is a sectional view taken along line 7—7 in FIGURE 7.
FIGURE 8 is a sectional view taken along line 8—8 in FIGURE 2.
Figure 9:
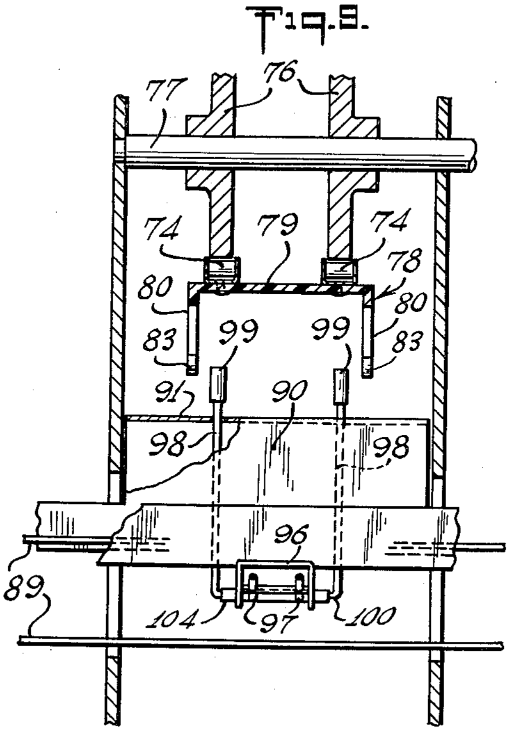
FIGURE 9 is a sectional view taken along line 9—9 in FIGURE 1.

It is well known that any color may be designated by its trichromatic coefficients $x$ and $y$ and its brightness which, in turn, may be determined by the colors tristimulus value X, Y and Z, which are proportional to the intensity in three different spectral ranges, commonly amber or red, green and blue. The filters usually employed in ascertaining X, Y and Z are those established by the Commission Internationale d'Eclairage (C.I.E.) or their equivalents. The trichromatic coefficients are determined by dividing X and Y respectively by X+Y+Z. This operation would necessitate the use of highly complex and costly computer. However, it has been discovered that any color can be completely and accurately specified by the functions Y, $X/Y$ and $Z/Y$ where X, Y and Z are the intensities of the color in three different spectral ranges. Relatively simple novel equipment has been produced for computing the functions Y, $X/Y$ and $Z/Y$ and there has also been produced an improved device for determining the tristimulus values X, Y and Z of an object, circuit networks for automatically handling and employing these values, and systems for mechanically handling and distributing the classified objects.

An important feature of the present invention resides in the provision of an improved color classifying apparatus comprising means for producing three first signals X, Y and Z varying in accordance with the tristimulus values of said color, means responsive to said first signals producing digital signals corresponding to the functions Y, $X/Y$ and $Z/Y$ and classifying means responsive to said digital signals. The object whose color is classified is transported by a conveyor past successive stations having coded ejector mechanisms. A digital color address signal corresponding to the functions Y, $X/Y$ and $Z/Y$ is transferred to successive stations in a memory bank in synchronism with the object and is read at each station to actuate a correspondingly coded station and effect the actuation of the respective ejector. Among other features of the present invention is an improved color analyzing device which includes a rotating color wheel conveying three analyzing filters, and a reference filter, a reflector, a light source and a photoelectric cell, the filters being in successive registry with the beam from the light source and the reflector registering with the light beam when the reference filter registers therewith to produce a reference beam for regulating purposes. A circuit network is provided for automatically regulating the light measuring sensitivity in response to the reference beam.

In accordance with a preferred form of the present invention, there is provided a color analyzing head which includes a driven shaft on which is mounted a shutter or reflector member a lower color wheel-carrying analyzer filter Y, X and Z and a reference Y filter and an apertured commutator member with which are associated a plurality of measuring, conversion, data-handling and data-employing devices. A delivery mechanism successively feeds objects into registry with an inspection window in the color head, and a light source directs a beam of light through the light wheel and shutter to the window and through the commutator to te photodiodes. An electron multiplier type photoelectric cell receives the beam of light passing through the filters and reflected from the object or reflector member.

The amplified output of the photoelectric cell during the Y color analyzing step, together with an adjustable added increment K1, is fed to an analogue to digital converter of modified design (which will hereinafter be described) thereby to produce a binary signal which is temporarily stored. The photocell X and Z outputs are each added to a respective K2 and K3 increment of Y and the series divided by Y converts to produce $X/Y+K2$, $Z/Y+K3$ binary signals which are temporarily stored. The $Y+K1$, $X/Y+K2$ and $Z/Y+K3$ define the color address of the object and are fed to a column of a stack of memory core planes. The addresses are shifted to successive columns upon each rotation of the color wheel and during each shift are compared with binary signals corresponding to ejector mechanisms to actuate the matching mechanism when the article is properly located. Means actuated by the $Y+K1$, $X/Y+K2$ and $Z/Y+K3$ binary signals record the number of objects whose coresponding signals fall above and below predetermined levels. The sensitivity of the color measuring system is regulated by developing an error signal in accordance with the amplified output of the phototube when exposed to the reflected beam, integrating the signal and adding the integrated signal in a degenerated sense to the phototube voltage supply.

Referring now to the drawings, and more particularly to FIGURES 1 through 9 thereof, reference numeral 12 generally designates the cigar feeding mechanism, reference numeral 13 the cigar color inspecting and electrical sequence control mechanism, reference numeral 14 the cigar transfer and inspection positioning mechanism, reference numeral 16 the cigar distributing conveyor, and reference numeral 17 the cigar ejection and discharge system. The cigar feeding mechanism 12 includes a trailing hopper 18 and upper and lower cooperating feed conveyors 19 and 20 respectively.

The lower feed conveyor 20 consists of an endless belt extending about front and rear end drums 22 and 23 and includes a bottom return run and a trailing horizontal advancing run section 24 and a leading forwardly downwardly inclined advancing run section 26, the underface of the belt between run sections 24 and 26 being supported by an idler roller 27. The upper conveyor 19 includes an endless belt extending about a pair of drums 28 and having a top return run and a bottom advancing run 29 substantially parallel to and somewhat less than coextensive with the lower conveyor run section 26 and located above said section a distance slightly less than the cigar thickness.

The hopper 18 is located above the run section 24 and is defined by parallel vertical front (not shown) and rear walls 30, a forwardly downwardly inclined trailing wall 32 which extends substantially to the trailing end of run section 24 and a leading vertical wall 33, the bottom edge of which is spaced above the conveyor run section 24 a distance slightly greater than the cigar thickness. Thus, cigars stacked in the hopper 18 rest on the conveyor section 24 and are carried under the wall 33 in side-by-side relationship between the conveyor runs 26 and 29 which transport them to the discharge ends of the conveyors 19 and 20.

Figure 6:
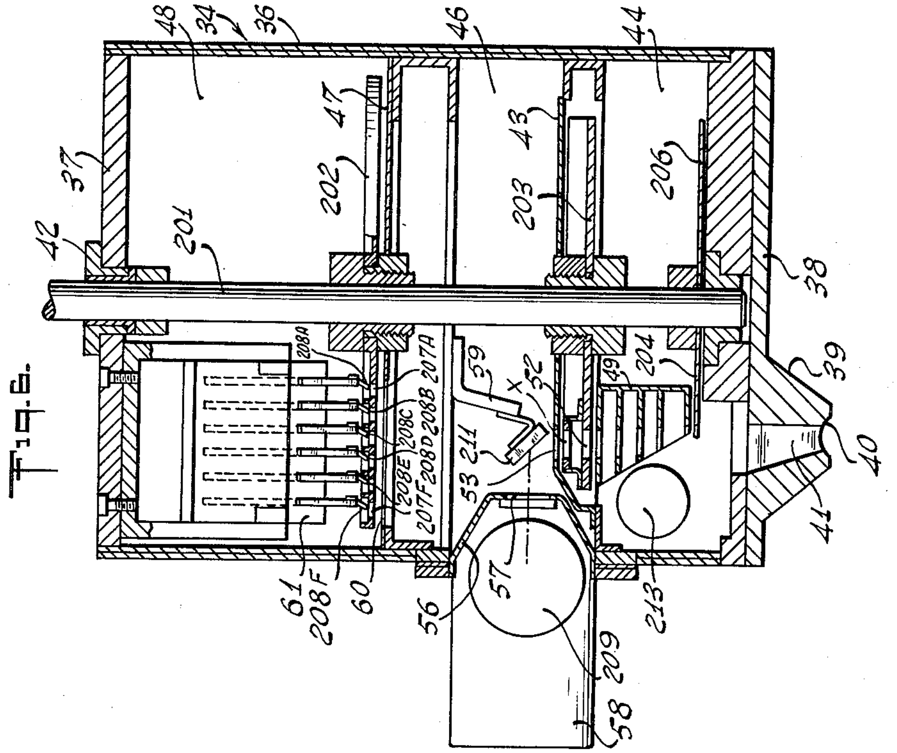
FIGURE 6 is a sectional view taken along line 6—6 in FIGURE 5.
Figure 5:
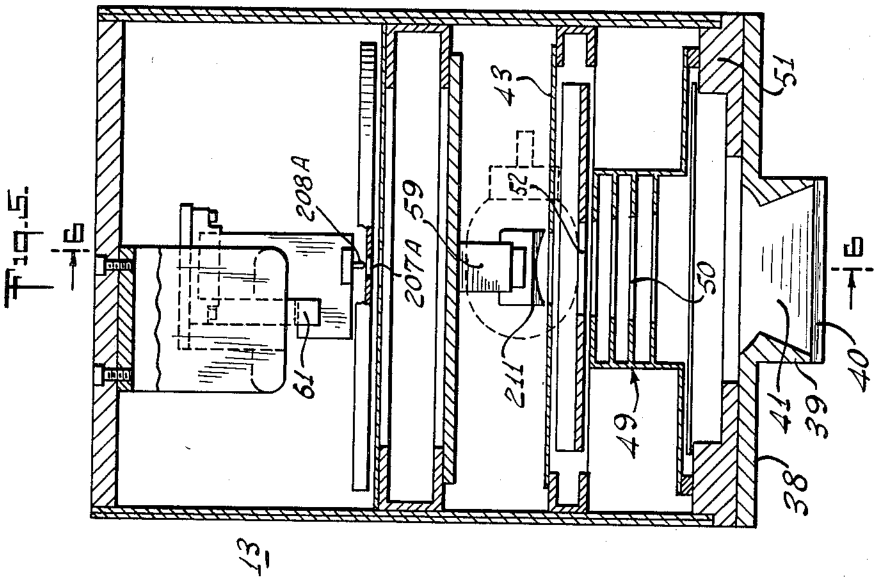
FIGURE 5 is a sectional view taken along line 5—5 in FIGURE 2.

Directly following the cigar feed 12 is the inspection analyzing and control head 13 which is best illustrated in FIGURES 5 and 6 of the drawings and comprises a substantially light-tight housing 34 including a peripheral wall 36, a top wall 37 and a bottom wall 38. Depending from the bottom wall 38 is a transversely extending nosepiece 39 having a downwardly directed concave underface 40, and provided with an elongated inspection window-defining slot 41 which communicates with the interior of the housing 34 through a corresponding opening in the bottom wall 38. A vertical shaft 201 is centrally located in the housing 34 and passes through the housing top wall 37 by way of a suitable bearing bushing 42 registering with an opening in said wall 37. A horizontal partition 43 extends across the housing 34 to divide it into lower and intermediate compartments 44 and 46, and an upper horizontal partition 47 separates the housing upper compartment 48 from intermediate compartment 46.

Located in lower compartment 44 and mounted on the shaft 201 adjacent the bottom thereof is a shutter member 204 which includes a light-reflecting sector 206 which periodically registers with window 41. Also located in compartment 44 is a multiple plate light baffle 49 which has a vertically directed aperture 50 aligned with window

41. The baffle 49 is provided at its bottom with outwardly extending wings which rest on spacer members located on a base plate 51 superimposed on the bottom wall 38 and having an opening registering with window 41. A photoelectric tube 213 is located between baffle 49 and the housing wall in the compartment 44 and has its light sensitive electrode directed toward the window 41 and shielded from light as it passes through the baffle 49.

Mounted on the shaft 201 by means of a suitable coupling collar is a scanning disc 203 which is located in the compartment 44 directly below the partition 43. Disc 203 has a plurality of circumferentially spaced openings 52 formed therein which lie along a path extending across the aperture axis of the baffle 49, and an aperture 53 is formed in the partition 43 and is also in alignment with the baffle aperture. Located on the upper face of disc 203 and supported by bracket members in registry with corresponding openings 52 are light filters X, Y, Z, RY and RX in a relationship which will be hereinafter set forth.

A well 56 is formed in the housing wall 36 and enters the compartment 46 in the vicinity of the partition opening 53 and is provided with a heat absorbing filter carrying front window 57. An electric lamp light source 209, as will hereinafter be identified is located directly behind the window 57 and is enclosed in a housing 58. Supported by a bracket 59 is an inclined parabolic mirror 211 facing window 57 and reflecting the light from the source 209 through apertures 53 and 50 and window 41 by way of successive light filters.

A commutating system is housed in compartment 48 and includes a commutator disc 202 located directly above partition 47 and suitably affixed to the shaft 201. Formed in the commutator disc 202 are a plurality of radially and circumferentially spaced commutator slots 207A to 207F whose extent and positions will be later described. A radially extending slot 60 is formed in partition 47 directly above mirror 211 so that a portion of the light emanating from the light source 209 passes through the slot 60.

A plurality of light sensitive photodiodes 208A to 208F and associated conventional amplifier networks are mounted on a support plate 61 which is carried by a bracket depending from and secured to the underface of the housing top wall 37. The photosensitive elements of the diodes 208A to 208F are disposed directly above commutator disc 202 along the partition slot 60 and register with the paths of corresponding commutator slots 207A to 207F. The commutating and color analyzing mechanism described above will be hereinafter discussed in further detail.

The cigar transfer and inspection position mechanism 14 is located below the inspection head 13 and includes a pair of transversely spaced, parallel, coaxial index wheels 63 mounted on a shaft 64'. The wheels 63 have circumferentially spaced recesses 64 formed in the peripheries thereof, the recesses 64 being in transverse alignment. It should be noted that the index wheels 63 are disposed on opposite sides of the drum 22 so that cigars transported by the conveyors 19 and 20 are delivered to successive pairs of recesses 64 and that the upper edges of the wheels 63 register with the nosepiece underface 40.

In order to bring a recess-carried cigar into snug, uniform engagement with the nose underface 40 for color analyzing purposes, there is provided a cigar lifting rod 65 which includes an upper vertical arm 66, a lower laterally offset vertical arm 67, and an intermediate horizontal connecting arm 68. Mounted atop arm 66 is a transverse cradle bar 69 extending between the wheels 63 and having a top face confronting the nose underface 40 and being of dihedral configuration. The arm 67 vertically slidably engages a bracket 70 and carries adjacent its lower end a cam follower 71. Follower 71 engages the periphery of a cam 72 which is mounted on a shaft 73 and is provided with a depressed section only for a minor extent of the cam, and a raised section for the remainder thereof. The cam 72 and lifter 65 are so dimensioned that upon rotation of cam 72 the cradle bar 69 is lowered below the base of the uppermost recess 64 for a short interval, and is raised above the recess base for the remainder of the cycle to bring a carried cigar into snug uniform engagement with nose underface 40 and in registry with window 41.

Following the transfer mechanism 14 is the distributor system 16 which includes a pair of transversely spaced, longitudinally extending parallel sprocket chains 74 which are supported and driven by longitudinally spaced pairs of sprocket wheels 76 mounted on shafts 77. The sprocket chains 74 advance along their upper runs and return along their lower runs.

Carried by the sprocket chains 74 and closely regularly spaced along the full length thereof are a plurality of cradle members 78. Each cradle member 78 includes a leading cross plate 79 extending between and secured to the sprocket chains 74. A pair of transversely spaced parallel side plates 80 project outwardly and trail the side edges of cross plate 79. The leading end of the side plate 80 is defined by a hook element 81 having a rearwardly directed opening and terminating in an inwardly directed tip whereby to support a cigar as the cradle 78 traverses its advance and return path as well as its end run, and to permit its ready longitudinal ejection from the cradle. The outer edge 82 of cradle 78 is outwardly rearwardly inclined from the plate leading end and terminates in an upright abutment element 83. As the cradle members traverse their trailing end runs the trailing sections thereof pass between the transfer wheels 63 and engage and remove the leading lowermost cigar carried by the wheels 63.

A conventional drive mechanism and coupling and translating arrangement are employed to drive the inspection head shaft 201, conveyors 19 and 20, transfer wheels 63, lift member 65 and sprocket chains 74. The shaft 201 is uniformly rotated, whereas the transfer wheels 63 are rapidly advanced a single increment during each rotation of shaft 201, said increment being defined by the spacing between successive recesses 64. The rest interval of wheels 63 between the advances thereof is relatively long and during such rest intervals the lift cradle bar 69 is raised by the cam 72 to its upper position. The drive of the sprocket chains 74 is so synchronized that the cradle members advance a single increment defined by the distance between successive cradles during each rotation of the shaft 201 so that cigars carried by successive transfer wheel recesses are engaged and removed by successive cradle members 78.

Positioned below the return run of cradle members 78 are the ejection and discharge mechanisms 17, successive mechanisms 17 being spaced by two cradle member increments whereby alternate cradles register with successive mechanisms 17. Each of the mechanisms 17 includes a pair of longitudinally spaced, transversely extending elongated strips 86 terminating at their trailing ends in depending bracket plates 87. A roller 88 is suitably journalled between the bracket plates 87 and engages discharge conveyor defining transversely extending endless belt 89, the forward end of which is suitably driven in any conventional fashion and discharges where desired.

Projecting upwardly from one of the strips 86 below the path of the cradles 78 is a vertical plate 90 which is connected by a horizontal arm 91 to a downwardly inclined plate 92 terminating in a depending arm 94. Mounted on the opposite strip 86 is an outwardly disposed bracket 96 which pivotally supports a longitudinally extending U-shaped wire lever 97 between the ends thereof. A pair of transversely spaced vertical rods 98 provided with enlarged upper ends or heads 99 slidably engage corresponding openings in arm 91 and are connected at their bottom by a horizontal integrally formed cross-rod 100. A helical compression spring 101 encircles each of rods 98 and is entrapped between cross rod 100 and the underface of arm 91 to normally resiliently urge rods 98 to their lowermost position with the heads 99 just below the path of the horizontal troughs of the carriage hook sections 81 along their return run.

Associated with each of the ejector mechanisms is an electric solenoid 102 cooperating with a vertically movable armature or plunger 103 which depends from the cross-bar of lever 97. The forward ends of lever 97 are connected to a sleeve 104 which is carried by the cross-rod 100. Upon electrical energization of a solenoid 102 the corresponding plunger 103 is drawn downwardly to raise rods 98 by way of lever 97 into the path of a carriage-carried cigar. The progress of the cigar is thus stopped, and as the carriage advances the cigar is disengaged from the hook sections 81 and drops onto the discharge conveyor 89 and conveyed to a corresponding bin or station. Only those solenoids 102 are energized at each cycle corresponding to an increment carriage advance wherein the color address of the adjacent trailing cigar matches that of the particular solenoid. The system for energizing the solenoids 102 in proper timed relationship is hereinafter set forth.

Figure 10:
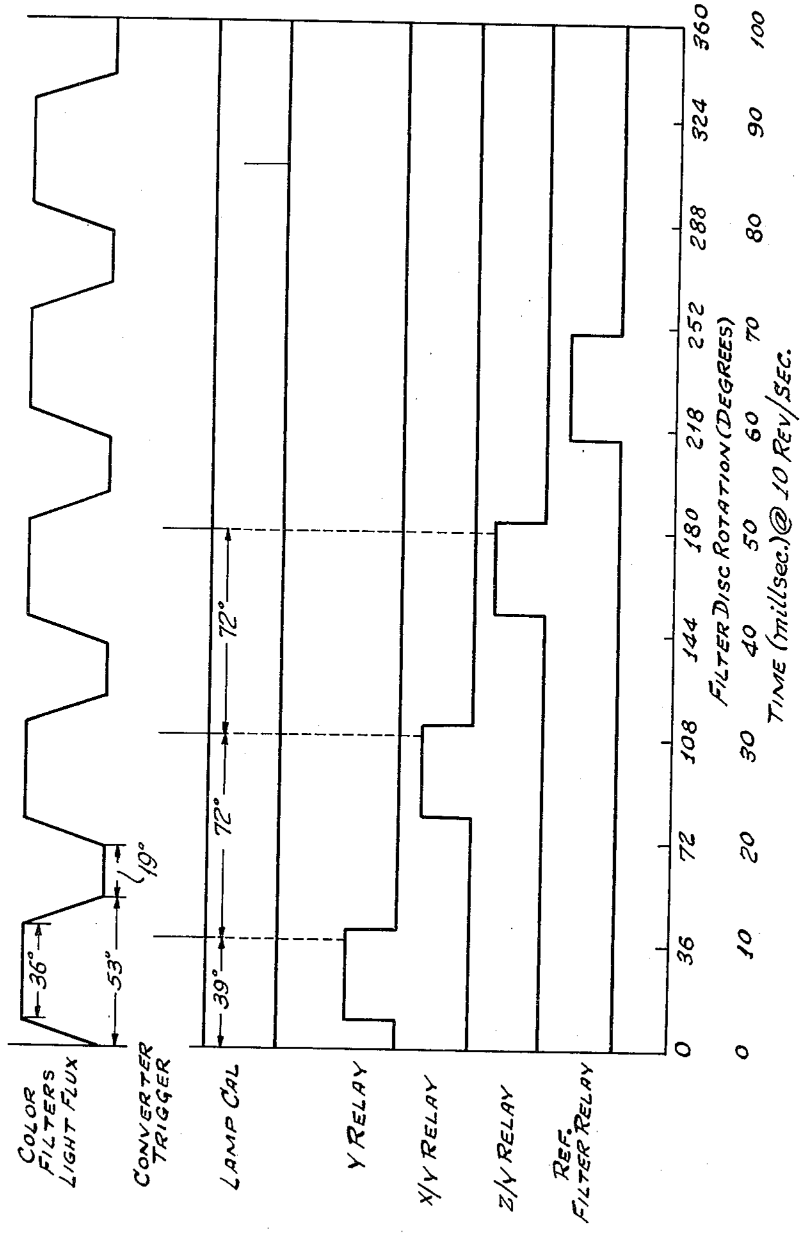
FIGURE 10 is a time sequence diagram of a cycle of operation of the present apparatus.
Figure 11A:
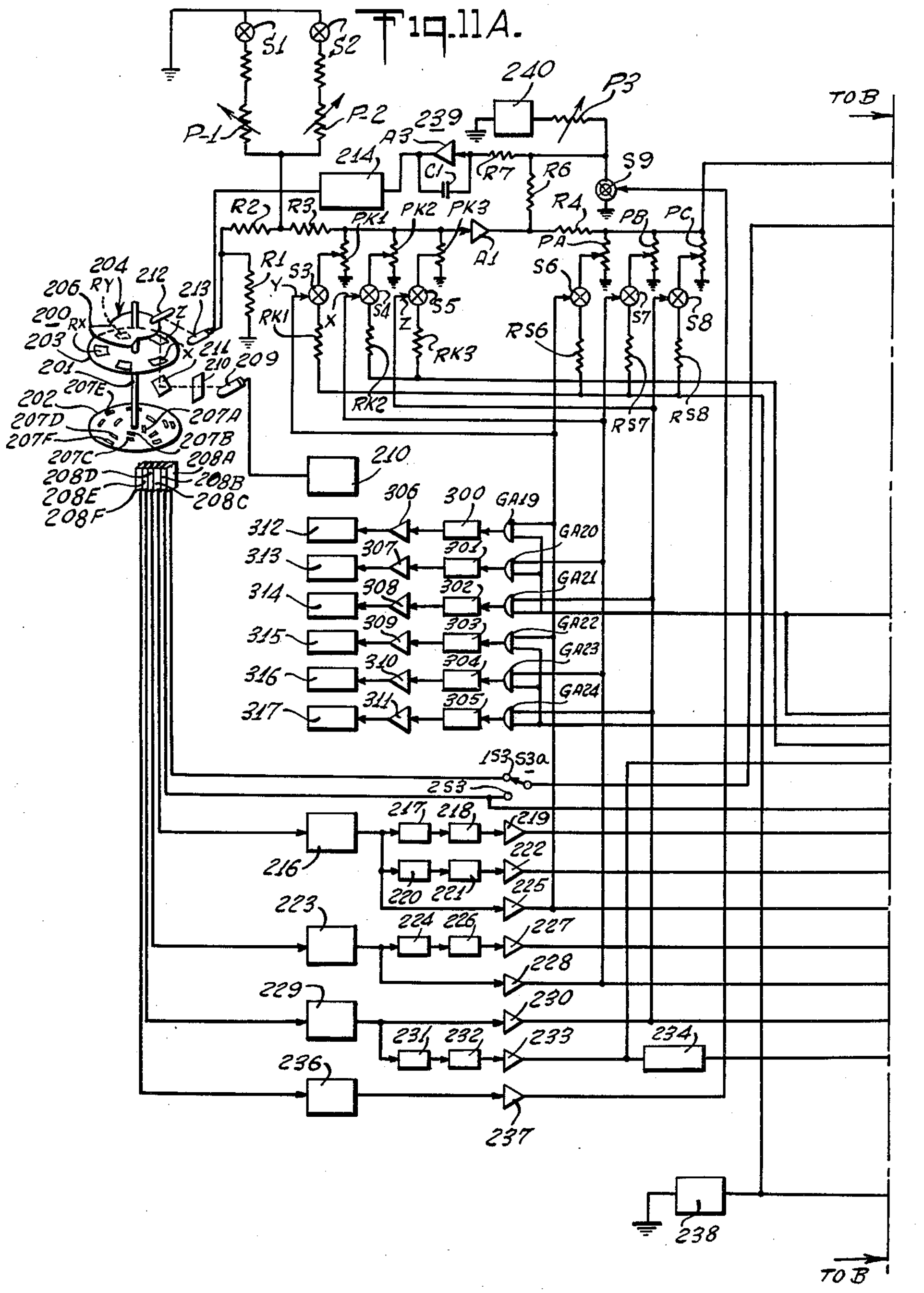
FIGURES 11A to 11C constitute a block circuit diagram of the electric network of the present apparatus.
Figure 11B:
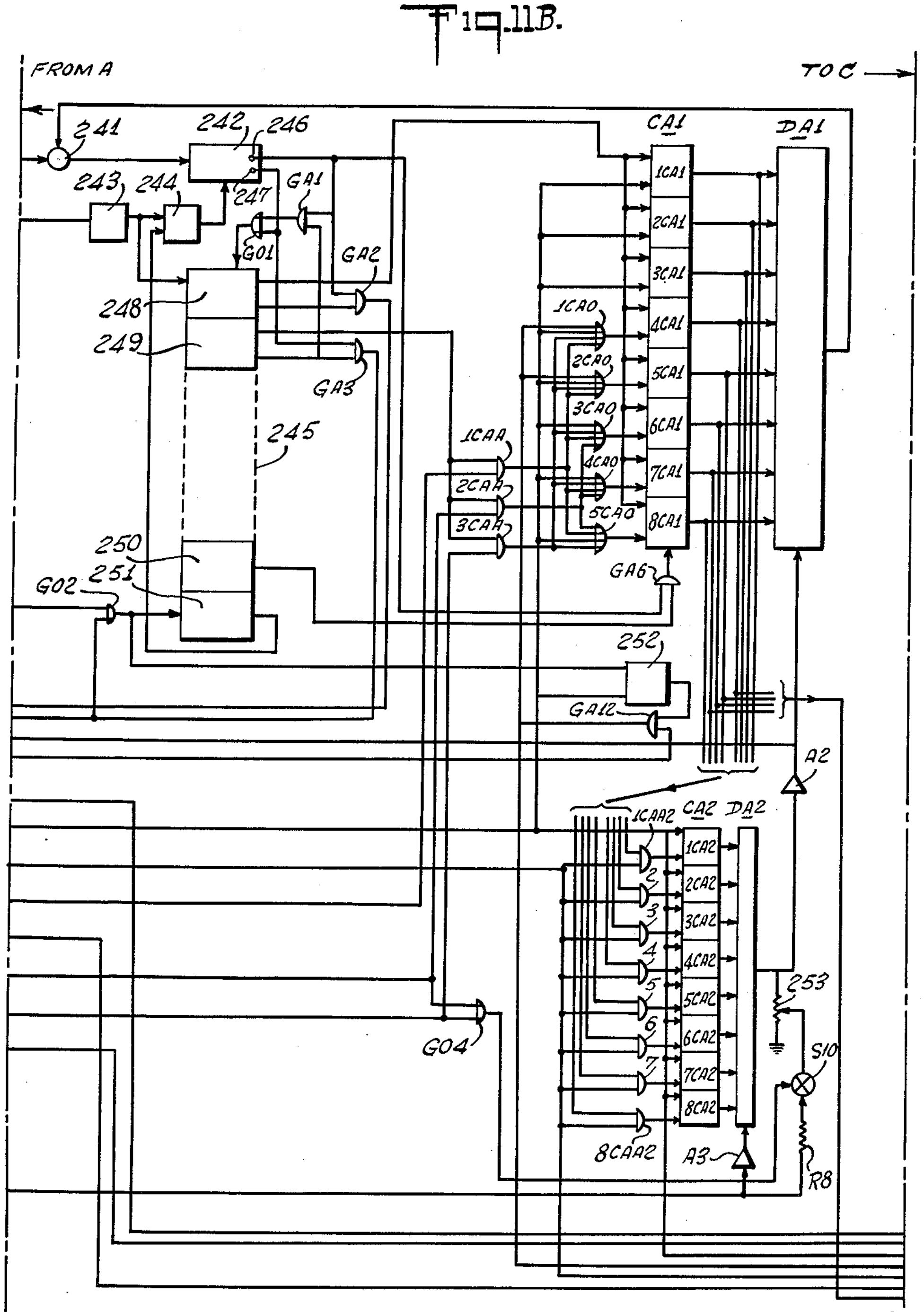
Figure 11C:
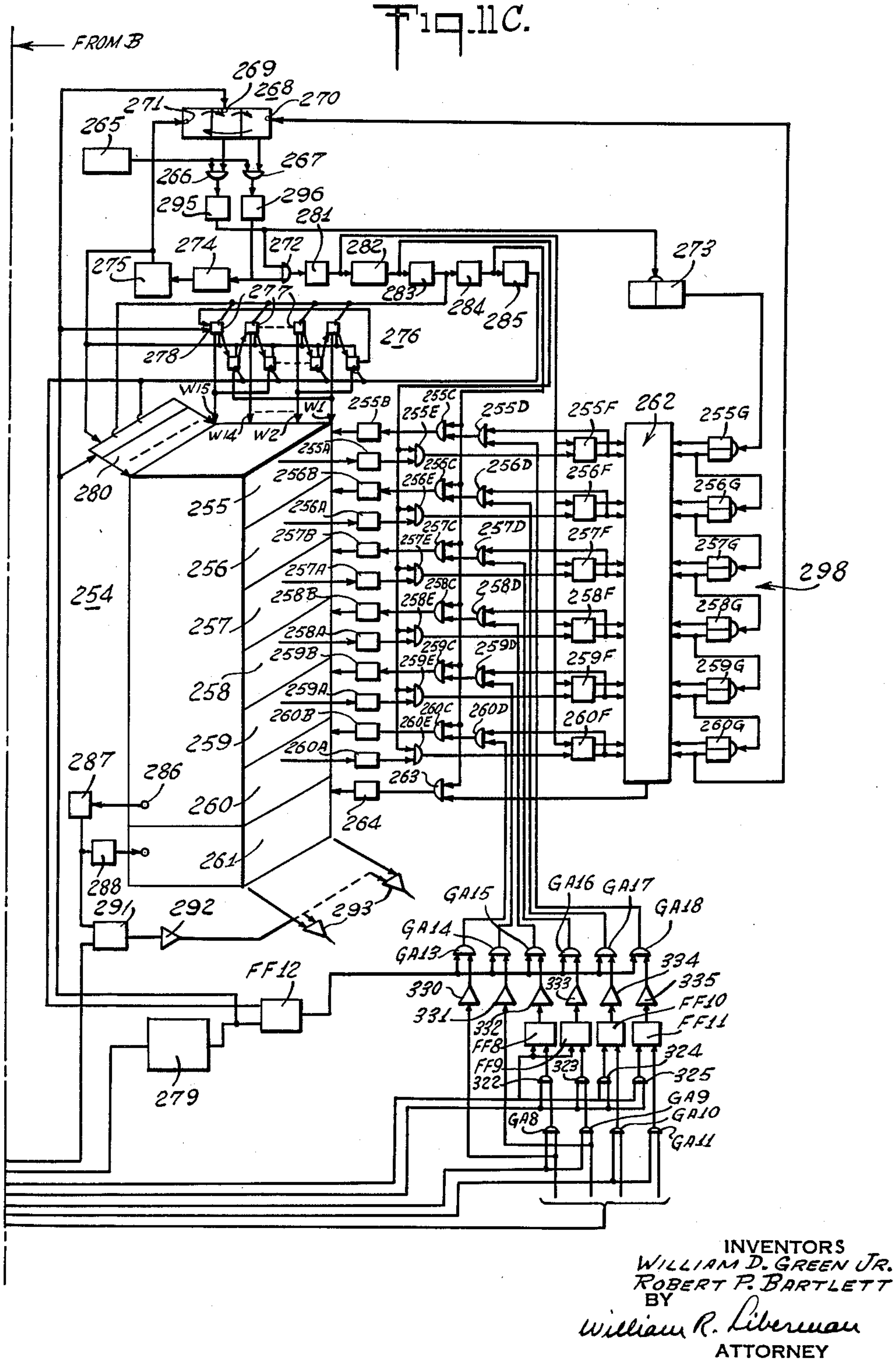

Referring to FIGURES 10 and 11 of the drawing which illustrates a circuit network for analyzing addressing and distributing cigars, in which sixty four distribution stations are employed, successive stations are separated by two increments, it being, of course, understood that the number of stations as well as the intervening increment between successive stations may be modified. Reference numeral 13 generally designates the inspection head which, as earlier described, includes shaft 201, synchronously driven a single revolution for each increment of the cigar carrying conveyor. Mounted on shaft 201 and axially spaced there along is slotted commutator disc 202, light filter carrying scanning disc 203 and a shutter member 204. The scanning disc 203 carries five angularly spaced light filters, Y, X, Z, RY and RX respectively, each of the filters extending approximately 50 degrees. The shutter member 204 includes a light reflecting sector 206 extending approximately 140 degrees and registering with the RY and RX filters. The commutator disc 202 has formed therein six radially spaced groups of commutator slots 207A through 207F, the path of each of the groups having associated therewith an amplifier-coupled photodiode 208A through 208F respectively which have sensitive elements registering with corresponding slots in the time sequence illustrated in FIGURE 10 of the drawing. The group of commutator slots 207A normally expose the corresponding photodiode 208A at approximately 36 degrees, 100 degrees and 190 degrees points on disc 202. The slots 207B expose diode 208B at approximately the 320 degree point on the photocommutator disc 202. The 207C slot exposes the 208C diode for approximately 10 degrees–40 degrees. The 207D slot exposes the 208D diode approximately 80 degrees–110 degrees. The 207E slot exposes the 208E diode at approximately 140 degrees–180 degrees, and the slot 207F exposes the diode 208F at about 220 degrees to 260 degrees.

Associated with the inspection head 13 is standard light source 209 comprising a 3000 degree Kelvin lamp energized by any suitable regulated power supply 210. The light from lamp 209 is directed through a heat filter and by way of a parabolic mirror 211 through the scanning disc 203 toward the inspection window 41 with which cigars 212 are periodically brought into registry. Directed toward the window delineated section of the cigar is photomultiplier tube 213, the cathode of which is connected to a highly regulated high voltage power supply 214 controlled in a manner which will be hereafter set forth. The various electrodes of the photomultiplier tube 213 are connected in a conventional manner and the principal anode is grounded through a load resistor R1 and is coupled by series connected resistors R2 and R3 to the input terminal of an amplifier A1. The junction point of the resistors R2 and R3 is connected by way of a first rheostat P1 and a normally open solid state switch S1 to ground, and by way of a second rheostat P2 and a second normally open solid state switch S2 to ground.

The output of the commutator photodiode amplifiers 208A and 208B are connected respectively to the terminals 1S3 and 2S3 of a manually operated switch S3. The output of the commutator photodiode amplifier 208C is connected to the input terminal of a Schmitt trigger circuit 216, the square wave output of which is applied through a first differentiating circuit 217 connected to a first clamping circuit 218 so as to apply a signal to the input of the clear amplifier 219 phased with the leading edge of the Schmitt trigger circuit output, and through a second differentiating circuit 220 and a clamping circuit 221 to the input of a transfer $Y \times K1$ amplifier 222. The input to the amplifier 222 is phased with the trailing edge of the Schmitt trigger circuit 216. Also connected to the output of the Schmitt trigger circuit 216 is the input of a Y gate amplifier 225. The output signal of the commutator diode 208D is connected to the input of a Schmitt trigger circuit 223, the output of which is connected in turn through a differentiating circuit 224 and a clamping circuit 226 to the input of a transfer $X/Y+K2$ amplifier 227. The input to the amplifier 227 is phased with the trailing edge of the square wave output of the trigger circuit 223. The output of the trigger circuit 223 is also connected to an X gate amplifier 228. The output of the commutator photodiode amplifier 208E is connected to the input of a Schmitt trigger circuit 229, the output of which is connected to the input of a Z gate amplifier 230, and through a differentiating circuit 231 and a clamping circuit 232 to the input of an amplifier 233, the output of which is connected to the input of a delay network 234, and the input signal to the amplifier 233 being phased with the trailing edge of the square wave output of the Schmitt trigger circuit 229. The output commutator photodiode amplifier 208F is connected to the input of the Schmitt trigger circuit 236, the output of which is connected to the input of the Y reference gate amplifier 237.

The input to the amplifier A1 is grounded through the parallel connected resistance elements of potentiometer PK1, PK2, PK3 respectively, the arms of the potentiometer PK1 being connected by way of a normally open solid state switch S3 and a resistor RK1 to the positive terminal of a standard reference voltage 238, the negative terminal of which is grounded. The arm of the potentiometer PK2 is connected by way of a normally open solid state switch S4 and resistance RK2 to the output of the variable reference voltage amplifier A2 as is the arm of the potentiometer PK3 through the switch S5 and the resistor RK3. The control terminals of the normally open switches S3, S4, S5 are connected to the outputs of the Y, X and Z gate amplifiers 225, 228 and 230 respectively. The output of the amplifier A1 is connected by way of a resistor R4, and parallel resistance elements of potentiometers PA, PB and PC to ground. The arms of the potentiometer PA, PB, PC are connected respectively through the solid state switch S6 and resistor RS6, the switch S7 and resistor RS7, and the switch S8 and resistor RS8 to the reference voltage source 238. The control elements of the normally open switches S6, S7 and S8 are connected respectively to the output of the Y gate, X gate and Z gate amplifiers 225, 228 and 230.

The output of the amplifier A1 is also coupled by way of series connected resistors R6 and R7 to the input of an integrating network 239 consisting of an amplifier A3, the output of which is degeneratively fed back by way of capacitor C1 to the input thereof. The output of the integrating network 239 is employed as a regulating reference voltage standard for the high voltage power supply 214. The junction of the resistors R6 and R7 is grounded by way of a normally closed solid state switch S9 and is connected by way of a rheostat P3 to the positive terminal of a reference voltage source 240, the negative terminal of which is grounded. The control elements of the normally closed solid state switch S9 is connected to the output of the Y reference gate amplifier 237.

The output of the amplifier A1 is also connected through the resistor R4 to the input terminal of a summing network 241, the output of which is connected to the input terminal of a high frequency comparator clock 242. The arm of the switch S3*a* is connected by way of a pulse shaping network 243 to the set terminal of a flip-flop circuit 244 and to the set terminal of the first flip-flop circuit 248 of a static shift register 245 which consists of a series of four tandem connected flip-flop circuits 248, 249, 250 and 251 respectively. The output of the summing network 241 is connected to the input of the clock 242 and the output of the flip-flop circuit 244 is connected to the control terminal of the clock 242. The clock 242 has a step output terminal 246 and a shift output terminal 247. It should be noted that the clock 242 is of conventional construction, the clock operating in response to the sense of the output signal from the flip-flop circuit 244 and producing an output signal alternatively at the terminals 246 and 247, in accordance with the polarity of the input signal to the clock 242. The clock output terminal 246 is connected to input terminals of AND gates GA1 and GA2 and the clock output terminal 247 is connected to input terminals of OR gate GO1 and AND gate GA3. The output of the AND gate GA1 is connected to an input terminal of the OR gate GO1 and output of the OR gate GO1 is connected to the input shift terminal of the static shift register 245. The steady state output of the static shift register first flip-flop circuit 248 is connected to input terminal of the AND gate GA2 whose output is connected to an input terminal of an OR gate GO2. The output of OR gate GO2 in turn is connected to the set terminal of the static shift registers last flip-flop circuit 251. The steady state output of the second shift register flip-flop circuit 249 is connected to input terminals of the AND gate GA1 and an AND gate GA3, the output of the latter being connected to the other input terminal of OR gate GO2.

In order to convert the analog signals corresponding to Y, X and Z as derived from the output of the amplifier A3 as applied to the input of the summing network 241 into binary digital words corresponding to the values $Y+K1$, $X/Y+K2$, and $Z/Y+K3$, there is provided a first conversion register CA1 and an associated digital to analog converter DA1, a reference register CA2 and an associated digital to analog converter DA2. The conversion register CA1 includes 8 tandem connected flip-flop circuits 1CA1 through 8CA1 whose reset terminal are connected to the pulse output of the flip-flop circuit 248. The AND gates 1CAA, 2CAA and 3CAA have one of their input terminals connected to the pulse output of flip-flop circuit 249, the other input terminals being connected to the outputs of the Y, X and Z gate amplifiers 225, 228 and 230 respectively. The output of the clear pulse amplifier 219 is connected to the set zero terminal of a flip-flop circuit 252, the set zero terminals of the conversion register flip-flops 1CA1 through 3CA1 one input of the OR gates 1CA0 through 5CA0, the set one terminals of the reference register flip-flops 1CA2 through 8CA2 one input of each of the OR gates 324 and 325, and to the reset terminals of flip-flop circuits FF8 and FF9. The output of AND gate 1CAA feeds one input of each of the OR gates 1CA0 through 5CA0 as does the output of AND gate 3CAA, and the output of AND gate 2CAA feeds an input of each of the OR gates 3CA0 through 5CA0. AND gate GA12 feeds one input of each of the OR gates 1CA0, 2CA0, 322, 323, 324 and 325, and the clear pulse amplifier 219 feeds reset terminals of flip-flop circuits FF8 and FF9. AND gate GA12 is fed by the output of the flip-flop circuit 252 and the output of the pulse amplifier 233.

The outputs of the conversion register flip-flop circuits 1CA1 through 8CA1 are connected to the corresponding input terminals of the digital to analog converter DA1, the output of which is connected to the summing network 241. The voltage reference input terminal of the digital to analog converter DA1 is connected to the output of the variable reference amplifier A2, the input to which is connected to the output of digital to analog converter DA2 and to ground through the resistance element of a potentiometer 253. The arm of the potentiometer 253 is connected by way of a normally open solid state switch S10 and a resistor R8 to the positive terminals of the voltage source 238.

The reset terminal of the reference register flip-flop circuits 1CA2 through 8CA2 are connected to the respective output terminals of the AND gates 1CAA2 through 8CAA2. Each of the AND gates 1CAA2 through 8CAA2 have two input terminals, the first of the input terminals being connected sequentially to the corresponding output terminals of the conversion register flip-flop circuits 1CA1 through 8CA1 and the other input terminals being connected to the output terminals of the transfer $Y+K1$ amplifier 222.

The outputs of the reference register flip-flop circuits 1CA2 through 8CA2 are connected to corresponding input terminals of the reference digital to analog converter DA2 the output of which is connected directly to the input of the variable reference amplifier A2 and is grounded through the resistant element of the potentiometer 253. The reference voltage input terminals of the digital to analog converter DA2 is connected to the output of a fixed reference amplifier A3, the input of which is connected to the positive terminal of the standard voltage source 238. The control element of the switch S10 is connected to the output of OR gate GO4 the input terminals of which are connected to the outputs of the X gate amplifier 228 and Z gate amplifier 230 respectively. The conversion register CA1 is provided with a count terminal which is connected to the output of AND gate GA6 having two input terminals connected respectively to the steady state output terminal of the shift register flip-flop circuit 250 and the step output terminal 246 of the clock 242. The pulse output of the shift register flip-flop 251 is connected to the reset terminal of the flip-flop circuit 244.

The network for assigning an address to each of the cigars in accordance with its tristimulus values and for distributing the addresses to actuate the matching stations includes a plurality of AND gates GA8 through GA11. The outputs of flip-flop of 4CA1 5CA1, 6CA1 and 7CA1 are connected to one input of AND gates GA8, GA9, GA10 and GA11 respectively. The other input terminals of the AND gates GA8 and GA9 are connected to the output of the transfer $Y+K1$ amplifier 222 and the other input terminals of the AND gates CA10 and GA11 are connected to the output terminals of the $X/Y+K2$ amplifier 227.

The outputs of AND gates GA8 and GA9 are connected to one input terminal of OR gates 322 and 323 respectively and the outputs of AND gates GA10 and GA11 are connected to the set terminals of flip-flop circuits FF10 and FF11 respectively. The outputs of OR gates 322 and 323 are connected to the set terminals of flip-flop circuits FF8 and FF9 respectively. The outputs of OR gates 324 and 325 are connected to the reset terminals of flip-flop circuits FF10 and FF11 respectively. The output of the clear amplifier 219 is tied to the reset terminals of flip-flop circuits FF8 and FF9 and to an input terminal of each of the OR gates 324 and 325. The second input terminal of each of the OR gates 322 through 325 is tied to the output of the AND gate GA12.

Following the flip-flop circuits FF8 through FF11 are six AND gates GA13 through GA18 each of said AND gates having two input terminals one set of which is connected to the output of a flip-flop circuit FF12. The other input terminals of the AND gates GA15 through GA18 are connected to the outputs of the corresponding amplifiers 332 through 335, the inputs to which are connected in turn to the outputs of the respective flip-flop circuits FF8 through FF11. The other input terminals of AND gates GA13 and GA14 are connected to the output terminal of conversion register flip-flop circuits 4CA1 and 5CA1 respectively, by way of associated amplifiers 330 and 331.

The memory and address advance system includes a magnetic core matrix 254 including 6 14 x 15 core planes 255 through 260 and a temporary storage core plane 261 having 64 magnetic cores. Each of the core planes 255 to 260 is provided with a readout winding connected to the input of a corresponding sensing network 255A through 260A and an inhibit winding connected to the output of a corresponding inhibit circuit 255B through 260B. The input to each of the inhibit circuits 255B through 260B is connected to the outputs of respective AND gates 255C through 260C, each of said AND gates having a pair of input terminals. One terminal of each of the inputs of the AND gates 255C through 260C is connected to the output of a corresponding OR gate 255D through 260D, each of the latter OR gates having two input terminals. The in-output of each of the sensing circuits 255A through 260A is fed into a corresponding input terminal of a respective two input AND gate 255E through 260E, the outputs of these gates being in turn fed to a set terminal of corresponding flip-flop circuits 255F through 260F. There is provided a comparing unit 262 of conventional construction which compares the outputs of the series of flip-flop circuits 255F to 260F with the outputs of tandem connected flip-flop circuits 255G through 260G which define a scale of 64 counter. The comparing unit 262 includes an output terminal which is pulsed in a well known manner only when the outputs of the flip-flop circuits 255F to 260F match the outputs of flip-flop circuits 255G to 260G. The comparing unit output terminal is connected to an input terminal of the two input AND gate 263 whose output is connected by way of an inhibiting circuit 264 to the inhibit winding of the temporary storage plane 261.

A memory clock, defining 40 kilocycle oscillator 265, has its output connected to one of the terminals of each of a pair of two terminal input AND gates 266 and 267, the other terminals of which are connected respectively to the second and third output terminals of a three-stage flip-flop circuit 268, which delivers second and third time pulses to each of the AND gates 266 and 267. The flip-flop circuit 268 includes three input terminals 269, 270 and 271, the pulsing of the terminal 269 effecting an output signal from the second stage of flip-flop circuit 268, the pulsing of the terminals 270 effecting a signal output from the third stage of flip-flop circuit 268 and the pulsing of the terminal 271 effecting no signal output from said second and third stages. The output of the AND gate 266 is fed through a pulse shaping circuit 295 to an input terminal of a two input OR gate 272 and to the input terminal of a scale of two counter 273 of any well known type. The output of the AND gate 267 is fed through a pulse shaper 296 to the other input terminal of the OR gate 272 and to the input of a scale of 113 counter 274, the output of which is connected through a pulse amplifier circuit 275 to the flip-flop circuit terminal 271 and to a thirty element ring connected shift register 276. The shift register 276 includes a series of thirty ring connected shift register elements 277, successive two register element separated pairs of register elements 277 being connected to successive core Y scanning wires, as illustrated, and functioning as will hereinafter be set forth. One of the shift register elements 277 has a loading terminal 278 which is connected by way of a pulse amplifier 279 and delay circuit 234 to the memory synchronizing amplifier 233. A twenty-eight element shift register 280 similar in construction to the register 276 is connected in the same manner to the fourteen Y scanning lines of the core planes 255 through 260.

The output of the OR gate 272 is connected by way of a pulse generator 281 to the respective reset terminals of the flip-flop circuits 255F through 260F and to the input terminal of a second pulse generator 282. The output of the pulse generator 282 is connected to input terminals of the AND gates 255E through 260E and to the input of the pulse generator 283. The output of the pulse generator 283 is in the shape of the read pulse and is connected to the shift winding of alternate elements 277 of the ring connected shift register 276 and to the shift winding of alternate elements of the ring connected shift register 280 and to a pulse generator 284 triggered by the trailing edge of the pulse output of circuit 283. The output of the pulse generator 284 is connected to one of the terminals of AND gates 255C through 260C and 263 and through a pulse generator 285 to the shift winding of the other alternate elements of the shift registers 276 and 280. The output of pairs of shift register elements 277, separated by intervening pairs of successive elements 277, are connected to respective successive X scanning lines W–1 through W–15.

A terminal 286 providing a signal responsive to the last scanned core position of the core plane 261 is connected to the input of the end marker amplifier 287, the output of which is fed through a drive circuit 288 to readout winding of the core plane 261 and to the set terminal of the solenoid pulse timing flip-flop network 291, the output of which is applied by way of an amplifier 292 to the extinguishing terminals of solenoid driver amplifiers 293. The input triggering terminal of each of the solenoid driver amplifiers 293 is connected to a corresponding core element of the core plane 261. The output of each of the amplifiers 293 is connected to a corresponding solenoid 102.

A network for counting the inspected articles which fall outside of the range of the classification standards includes six mechanical counters, 312 through 317, respectively, each of the counters being actuated by the output of corresponding amplifiers 306 through 311, the inputs of which are connected to the outputs of respective monostable multivibrators 300 through 305. Connected to the input terminal of each of the multivibrators 300 through 305 is the output of a corresponding AND gate GA19 through GA24 each of the aforesaid AND gates being provided with two input terminals. One of the input terminals of each of the AND gates GA19, GA20 and GA21 is connected to the output of AND gate GA2 and one of the input terminals of each of the AND gates GA22 and GA23 and GA24 is connected to the output of the AND gate GA3. The other input terminals to AND gates GA19 and GA22 are connected to the output of the Y gate amplifier 225. The other terminals of AND gates GA20 and GA23 are connected to the output of the X gate amplifier 228, and the other input terminals of the AND gates GA21 and GA24 are connected to the output of the Z gate amplifier 230.

Considering now the operation of the circuit network described above, a cigar 212 is brought into registry with the light beam reflected by the mirror 211 through the scanning disc 203. As the first filter Y is brought into the path of the light beam, the light passing therethrough is reflected by the exposed section of the cigar and falls upon the sensitive phototube 213 to produce a corresponding Y signal at the input of the amplifier A1. Concurrently, therewith, the photodiode 208C is exposed to light through a corresponding commutator slot 207C to energize the Schmitt trigger 216 and at approximately the trailing end of energization of the photodiodes 208C, the photodiode 208A is exposed through a corresponding commutator slot 207A to a light pulse. The energized photodiode 208A initiates the operation of the clock 242 by way of the pulse shaper 243 and flip-flop circuit 244. The output pulse of the pulse shaper 243 is fed into the static shift register 245 shifts the latter to deliver a pulse which sets the conversion register flip-flop circuits 1CA1 through 8CA1 to their one-state. Concurrently, therewith, the output digital to analog converter DA1 is set at maximum output by the conversion register CA1 and delivers a maximum signal to the summing network 241 which is of negative polarity relative to the input signal to 241, which is the amplified Y signal. The added signals are introduced into the input terminal to the clock 242 which is so set that should the output signal from the converter DA1 be smaller than the Y signal delivered to the summing network 241 a pulse is put out at terminal 246, which is delivered to the input of AND gate GA2, which receives a steady signal from the shift register flip-flop network 248 to deliver a pulse through the OR gate GO2 to the stop terminal of the shift register 245. An output pulse is thus established by the end section 251 of the shift register 245 which is fed to the reset terminal of flip-flop circuit 244 to interrupt the output of the clock of 242. Also, the pulse coming through the OR gate GO2 sets the reject flip-flop circuit 252. The output signal from AND gate GA2 is also delivered to the AND gate GA19 which concurrently receives a signal from the Y gate amplifier 225 to actuate the monostable multivibrator 300 which motivates the counter 312 a single digit, thereby indicating the Y reflectance signal for the article under inspection is too high to fall within the set sorting range.

In the event that the Y signal delivered to the summing network 241 does not exceed the maximum output signal from the digital to analog converter DA1 a signal is delivered from summing network 241 to the clock 242 which results in a pulse output from the clock terminal 247 which in turn is delivered through the OR gate terminal GO1 to the shift terminal of the static shift register 245 which shifts the output to the next succeeding pair of terminals from section 249. The steady state output from section 249 is delivered to AND gates GA1 and GA3. Concurrently, the single pulse output from the register section 249 is applied to one terminal of the AND gate 1CAA, the other terminal of which is concurrently opened by a signal from the Y gate amplifier 225 to open the gates 1CAA and reset the conversion register sections 4CA1 to 8CA1 to their 0-state through the corresponding OR gates 1CA0 through 5CA0. The output signal from the converter DA1 is, thus, set to the low pre-set Y value, the remaining outputs from the register sections 1CA1 through 3CA1 having remained at 1. If the Y signal delivered to the summing network 241 is less than the signal from the converter DA1 a shift pulse is emitted at the terminal 247 which passes through the gate GA3 and gate GO2 to the stop terminal of the shift register and through gate GA22 which also receives a signal from the Y gate amplifier 225 to actuate the Y low mechanical counter 315. As a result of the signal delivered to the register section 251, an output signal from 251 resets the flip-flop circuit 244 which, in turn, stops the clock 242. Should the Y signal to summing network 241 exceed the low Y limit signal from the converter DA1, then a step pulse originates at the terminal 246 and is applied to the shift terminal of the register 245 by way of gates GA1 and GO1 to advance the shift register output from section 249 to 250, the steady state output signal of the latter being applied to the gate GA6 which allows pulses from the clock terminal 246 to pass through the AND gate GA6 and be counted in the register CA1. As the counting proceeds in the register CA1 the output signal from the converter DA1 increases until a point where it exceeds the Y input signal to summing network 241, at which point the output signal from the clock shifts from the terminal 246 to the terminal 247, passes through OR gate GO1 to shift the static shift register output from section 250 to the following section 251, closing the counting gate GA6, and pulsing the flip-flop circuit 244 which stops the clock 242.

It should be noted that the Y signal level may be adjusted by way of the potentiometer PK1 to introduce an adjustable voltage thereby permitting variation in the level of the Y signal for a given number in the register CA1. This allows articles of different brightnesses to be given the same address or classification at different times in accordance with the potentiometer setting. The voltage is introduced by way of the switch S3 which is closed upon application of the Y gate signal from the amplifier 225. The source of the voltage introduced by way of the potentiometer PK1 is the voltage standard 238. In addition to the K1 voltage, there is also added to the Y signal a dark current correcting voltage A which is derived from the voltage standard 238 by way of the potentiometer PA. Here again, the correction voltage is inserted only upon the closing of the switch S6 which is actuated by the Y gate signal from amplifier 225. It should be here noted that where there has been referred to here above and hereinafter as the Y signal, unless otherwise stated, this refers to the Y signal plus the K1 voltage and the dark current correcting voltage A. The dark current voltage is determined for each filter by inserting a black reflecting surface in the path of the inspection beam and measuring the output voltage. This output voltage is then compensated by the inserted A voltage.

At the beginning of the Y signal, the leading edge of the output signal from the Schmitt trigger network 216 is delivered to all of the sections of the reference register CA2 to set all of these sections at the 1-state. Consequently, the output of the reference register CA2 and the convertor DA2 is at maximum. The analog output of convertor DA2 is fed through the reference amplifier A2 to the reference input terminal of the convertor DA1. Thus, inasmuch as a constant signal is delivered from the convertor DA2 when set at its maximum state, the Y digital signal is only dependent on the value of the Y as modified by the K1 and A voltages as above set forth. Following the Y light reflectance of the inspected article the commutator slots 207C closes to de-energize the photodiode 208C which de-energizes the Schmitt trigger circuit 216 which, in turn, produces an output signal from the amplifier 222 timed with the trailing edge of the Schmitt trigger output. The output signal from the amplifier 222 is delivered to one set of input terminals of the reference register gates 1CAA2 through 8CAA2, the other input terminals thereof being connected to the corresponding outputs of the successive sections of the conversion register CA1. Thus, the state of the various sections of the reference register CA1 and CA2 are the same, and the digital value of Y appears in the reference register CA2 and appears as a corresponding analog voltage at the output of the convertor DA2. The signal from the amplifier 222 is also delivered to one set of terminals of the AND gates GA8 and GA9 the other terminals of which are connected to the conversion register sections 4CA1 and 5CA1, whereby to set the flip-flop circuits FF8 and FF9 by way of the OR gates 322 and 323 to states corresponding to that of the conversion register sections 4CA1 and 5CA1 and, hence to the value of Y. Of course, it should be noted that the range of $Y+K1$ may be extended or contracted by varying the number of flip-flop circuits.

Following the above sequence, the next or X filter replaces the Y filter upon rotation of the scanning disc 203, exposing the cigar to the light through the X filter which is reflected thereby to the phototube 213. Concurrently therewith the diode 208D is exposed to light through a corresponding commutator slot 207D to energize the Schmitt trigger 223 and at approximately the trailing end of energization of the photodiode 208D, the photodiode 208A is exposed through a corresponding commutator slot 207A to a light pulse. The energized photodiode 208A initiates the operation of the clock 242 and sets the conversion register flip-flop 1CA1 through 8CA1 to their 1-state in the manner previously set forth. The output of convertor DA2 a voltage proportional to $Y+K1$ is modified to subtract a voltage proportional to K1 and produce a voltage proportional to the unmodified value of Y by closing the switch S10 which is actuated by the X gate amplifier 228 through the OR gate G04, the value of the adjustment being effected by way of the potentiometer 253 which is brought to correspond to that of potentiometer PK1. Thus, the reference voltage delivered at this time to the convertor DA1 is a voltage proportional to the absolute value of the Y reflectance signal modified only by the dark current correction voltage A so that the voltage to digital conversion for the X value will produce a digital number inversely proportional to the unmodified true Y. The signal corresponding to X derived from the photo tube 213 is adjusted during the Y analysis by the closing of the switch S4 which is actuated by the X gate amplifier 228 to produce a voltage K2Y by reason of the resistance element of the potentiometer PK2 being connected through a switch S4 and resistor PK2 to the output of the variable reference amplifier A2 whose output is proportional to Y. The signal which appears then at the summing network 241 is $X+K2Y$, the closure of switch S7 having applied the dark current compensation voltage in the same manner as the Y signal was compensated. The analog signal $X+K2Y$ is converted to a digital signal $$\frac{X+K2Y}{Y}$$

or $X/Y+K2$ in the manner previously set forth with the conversion of the analog $Y+K1$ to a digital signal with the exception of making the reference input to convertor DA1 proportional to Y to accomplish the division by Y, and in a like manner $X/Y+K2$ signals are stored in the flip-flop circuits FF10 and FF11. Similarly the X high and X low signals actuate the X high and X low mechanical counters 313 and 316 in the manner earlier set forth.

In the manner employed in obtaining and storing the $X/Y+K2$ digital signal, the $Z/Y+K3$ digital signal is obtained when the Z filter intercepts the light beam except that the digital signal is temporarily stored in the conversion register sections 4CA1 and 5CA1 which are connected by way of amplifiers to the AND gates GA13 and GA14.

Following the Z analyzing filter, the RY filter is brought into registry with the light beam as is the light reflecting section 206 of the wheel 204 to direct a sample beam to the phototube 209. Concurrently therewith, the photodiode 208F is energized by reason of the commutator wheel slot 207F registering therewith to actuate the Schmitt trigger circuit 236 which opens the normally closed switch S9 through the Y reference gate amplifier 237, thereby applying the output of the amplifier A1 as subtracted from the reference voltage source 240 to the input of the integrator 239, the output of which is employed as a reference voltage standard for the regulated power supply 214. Thus the overall sensitivity of the color measuring network is highly regulated and substantially independent of variations in the phototube or light source.

The arrangement for storing and advancing the address of the inspected article as derived from the digital signals corresponding thereto and for energizing the corresponding release mechanisms operates in the following manner: After the address of the inspected article has been temporarily stored in the flip-flop circuits FF8 through FF11 and in the register sections 4CA1 and 5CA1, the photodiode 208E is deenergized by the passing of the corresponding commutator slot 207E to de-actuate the Schmitt trigger circuit 229. A memory synchronizing pulse is generated at the output of amplifier 233 which feeds the delay circuit 234 and pulses the AND gate GA12. If the reject flip-flop 252 has been set to one because any of the variables $Y+K1$, $X/Y+K2$ or $Z/Y+K3$ is out of the sorting range for the article under inspection, the memory synchronizing pulse passes through gate GA12 and sets the flip-flops 4CA1, 5CA1 and FF8 through FF11 through corresponding OR gates 1CA0, 2CA0 and 322 through 325 to a digital number defining the reject address. It should be noted that the above address does not corresponding to any permissible address of a distributed article. The trailing edge of the pulse output of the Schmitt trigger circuit 229 as delayed by the network 234 passes through the pulse amplifier 279 to set the flip-flop circuit FF12 to its 1-state opening the gates GA13 through GA18 permitting the signals from the flip-flop circuits FF8 through FF11 and 4CA1 and 5CA1 to feed the AND gates 255C through 260C through the OR gates 225D through 260D. The output of the pulse amplifier 279 sets the leading section of the shift registers 276 and 280 to the 1-state and shifts the 3-stage flip-flop 268 so that a signal is delivered to the AND gate 266. The pulses from the clock 265 pass through the AND gate 266 and pulse shaper 295, the output of which passes through the OR gate 272 and the pulse generator 281. The output pulses from the circuit 295 are also directed to the input terminal of the scale of two counter 273. The output of the circuit 281 resets the flip-flop circuits 255F through 260F and energizes the pulse generators 282 and 283 in tandem.

Each of the core planes 255 through 260 includes a group of memory elements corresponding to the digits derived from the flip-flop circuits FF8 through FF11 and 4CA1 and 5CA1 the core elements being arranged in each plane in 15 rows along the X axis fourteen elements along the Y axis in each row. As is well known, each of the memory elements is interlaced by a pair of scanning wires which are common to the seven core planes 255 through 261. The X scanning wires are pulsed by the memory clock 265 through the shift register 276 and the Y scanning wires are pulsed in synchronism with the X scanning wires likewise by the clock 265 through the shift register 280. Upon a full scanning of the planes, a pulse is derived at the terminal 286 in the well-known manner and is amplified by the amplifier 287 to set the flip-flop circuit 291. Thus, fourteen scannings of all the Y scanning wires and fifteen scannings of the X scanning wires effects the scanning of all the memory elements in all of the core planes. It should be noted that the shift register 276 is advanced two steps for each pulse from the clock 265 by reason of the separate shift windings tied to pulse generating circuits 283 and 285, the generators 284 and 285 being triggered by the trailing edge of the pulse from 283.

Asuming that the present equipment is in operation and the conveyor belt carrying its full complement of articles, the bit of the address of each article will be carried by a corresponding memory element in each of the core planes 255 through 260. A signal from the pulse generator 282 is applied to an input terminal of each of the AND gates 255E through 260E and substantially simultaneously the pulse output from the circuitt 283 is applied to the read shift windings of the shift register 276 and 280 advancing the one from the first register element to the next successive element, to energize a corresponding memory element in each of the core planes 255 through 260. The readout signals from the core planes 255 and 260 are fed through the readout amplifiers 255A through 260A and the AND gates 255E through 260E to the flip-flop circuits 255F through 260F, setting these flip-flop circuits in accordance with the state of the respective memory elements. Inasmuch as an ejector mechanism is located along the conveyor at every other increment thereof, the counter 273 delivers a pulse to the binary counter 298 for every other readout pulse applied to the memory bank. In this manner, the address of each station is set into the counter 298 so that it may be compared to the address of the corresponding registering cigar as stored in corresponding cores in the core planes 254. The pulses applied to the binary counter 298 are counted in accordance with the position of the cores being read in the memory 254, hence in accordance with the location of the ejector mechanisms or station along the conveyor belt. The comparing unit 262 generates a pulse when the ouput of the binary counter 298 matches the output of the buffer storage flip-flop circuits 255F through 260F which is an indication that the address of the respective article matches the address of the station with which it registers. The pulse from the comparing unit terminal 262 is delivered by way of the AND gate 263 and the inhibit circuit amplifier 264 to the read-in wire of the temporary memory storage unit 261. It should be noted that the pulse delivered through the amplifier 264 is read into a respective memory unit in the core plane 261 as scanned by the circuits 276 and 280. Following the first readout in the cycle, which is the last set of memory units in the memory bank 254, the gates 255C through 260C are opened by a pulse from the output from the amplifier 284, and a pulse from the generator 285 shifts the registers 276 and 280 by way of the AND gates 255C through 260C and inhibit circuits 255B through 260B, into the vacant first readout positions in the memory bank. On the next successive pulse from the oscillator 265 the signal from the pulse generator 282 followed by the pulse generator 283 readies the readout gates 255E through 260E and delivers a pulse to the read shift windings of the registers 276 and 280 to effect the reading out of the core positions for the second oldest address in the memory bank 254. The address actuates the buffer storage flip-flop circuits 255F through 260F in the manner previously set forth.

Thereafter, a write enable pulse from the generator 284 energizes the AND gates 255C through 260C and is followed by a write pulse from the generator 285 which energizes the write shift windings of the registers 276 and 280 to shift the scanning planes to the next preceding scanning wire, thus reading in the signals from the buffer storage flip-flop circuits 255F through 260F. The above sequence is repeated for all article positions associated with the conveyor so as to store signals in the core plane 261 at positions corresponding to those where the address of the article matches the release mechanism at the particular time. The above sequence is continued until all the article addresses have been sensed and advanced and compared with the release mechanism addresses. There are no cores in the core plane 261 associated with the conveyor positions between release mechanism, hence outputs of the comparing units for articles in these positions do not affect the ejector mechanism. When the binary counter 298 has reached a number corresponding to the number of ejector mechanisms or stations, an output pulse is derived therefrom and applied to the 3-stage flip-flop 268 to shift the output to the next successive stage which applies a signal to the AND gate 267 thereby feeding the pulses from the oscillator 265 through the pulse shaping network 296 to a counter 274 and an OR gate 272. It should be noted that the scale of the counter 274 is equal to the number of increments between the inspection window of the analyzer and the first ejector mechanism or station. Following a full count by the counter 274, a pulse is generated thereby which is amplified by the network 275, the pulse output of which shifts the 3-stage flip-flop circuit 268 to its first stage and also removes the one signal from the shift registers 276 and 280 so as to clear the memory bank scanning wires.

Following the scanning of the last set of memory elements in the core planes 255 through 260, a pulse originates at the terminal 286 which is amplified by the circuit 287 and applied by way of a readout driving network 288 to all the scanning lines of the core plane 261 to deliver corresponding signals to the various solenoid drive amplifiers 293 which are triggered by the individual readout windings of the corresponding loaded memory cores in the core plane 261, thereby to energize the corresponding solenoids 102. The pulse from the amplifier 287 is also applied to the set terminal of the flip-flop circuit 291 to energize it. Following the activation of the ejector solenoids 102 by the amplifiers 293, a pulse is generated by the photodiode 208B which has been momentarily exposed by a corresponding commutator slot 207B, to apply a pulse to the re-set terminal of the flip-flop circuit 291 which, in turn, delivers a pulse through the amplifier 292 to the various amplifiers 293, deactuating the latter and de-energizing the solenoids 102.

The above cycle is periodically repeated for each successive article or cigar brought into registry with the inspection window. The article, after having been analyzed, is then transferred to a conveyor carriage and transported an increment for each cycle to its respective station.

While there has been described and illustrated a preferred embodiment of the present invention, it is apparent that numerous alterations, omissions and additions may be made without departing from the spirit thereof. Moreover, although the subject apparatus is illustrated and described herein as employed in the color classification and distribution of cigars it may be employed wherever it is desired to analyze the color of an article, to classify articles according to color, to distribute articles according to their color, to control a process or treatment in accordance with the color of a substance or the like. For example the color analyzing arrangement of the present apparatus may be used in the inspection of textiles, fabrics, plastics, paints, pigments, dyes, fruits and other natural materials or any object or substance whose color classification or identification is desired.

Having now described the invention, what is claimed and desired to be covered by Letters Patent is:

1. An improved color classifying apparatus, comprising means for producing three first signals X, Y and Z varying in accordance with the tristimulus values of said color, means responsive to said first signals producing digital signals corresponding to the functions Y, $X/Y$ and $Z/Y$ and classifying means responsive to said digital signals.

2. An improved apparatus for color classifying an object, comprising means for producing three analogue signals X, Y and Z in accordance with the color reflecting properties of said object in three different spectral ranges, means converting said analogue signals into digital signals which are functions of Y, $X/Y$ and $Z/Y$ and classifying means responsive to said digital signals.

3. An improved apparatus for color classifying an object comprising means producing three analogue signals X, Y and Z in accordance with the color reflecting properties of said object in three different spectral ranges, means converting said analogue signals into digital signals corresponding to the functions $Y+K1$, $X/Y+K2$ and $Z/Y+K3$ where K1, K2 and K3 are predetermined increments and classifying means responsive to said digital signals.

4. An improved apparatus in accordance with claim 3, wherein K1, K2 and K3 are independently variable.

5. An improved apparatus for color classifying an object comprising means sequentially producing three analogue signals Y, X and Z in accordance with the color reflecting properties of said objects in three different spectral ranges, means converting said analogue signals into digital signals which are functions of Y, $X/Y$ and $Z/Y$ defining the digital address of each object, means for temporarily storing said digital address, classifying means responsive to said digital address, and means transferring said digital address from said storage means to said classifying means.

6. An apparatus in accordance with claim 5, including means for adding adjustable increments to said digital signals X, $X/Y$ and $Z/Y$.

7. An apparatus in accordance with claim 5, including means for adding to said X analogue signal an analogue increment corresponding to $K2/Y$ and to said Z analogue signal an analogue increment corresponding to $K3/Y$ wherein K2 and K3 are adjustable.

8. An apparatus in accordance with claim 7, including means for adding to said Y signal an adjustable increment K1.

9. An improved apparatus for classifying an object comprising a plurality of stations having different digital addresses a conveyor carrying said object into successive registry with said stations, an object ejector associated with each of said stations, a light measuring device producing an analogue signal varying in accordance with the intensity of the light incident thereon, a light source directing a beam of light toward said object which is reflected to said light measuring device, a color wheel driven in synchronism with said conveyor and carrying three light filters having different spectral transmission ranges into successive intersecting registry with said light beam, conversion means responsive to said analogue signals upon successive registry of said three filters with said light beam producing a digital address of said object in accordance with the color thereof, means comparing said object address with the address of a corresponding registering station and means actuating said object ejector at that station whose address matches the address of said registering object.

10. An apparatus in accordance with claim 9 wherein said conversion means includes an analogue to digital convertor, and including means driven in synchronism with said color wheel successively actuating said convertor as said filters register with said light beam.

11. An improved apparatus for classifying an object comprising a plurality of stations having different digital addresses, a conveyor carrying said object into successive registry with said stations, an object ejector associated with each of said stations, color analyzing means producing a digital address in accordance with the color of said object, means comparing said object address with the address of a corresponding registering station, means actuating said object ejector at that station whose address matches the address of said registering object, reject stations, ejectors positioned at said reject stations, and means actuating said reject station ejectors when an article registering therewith is outside the range of said addressed stations.

12. An apparatus according to claim 11 including means counting the number of actuations of each of said reject ejectors.

13. An improved apparatus for classifying an object comprising a color analyzing device producing three successive analogue output signals Y, X and Z corresponding to the color reflecting properties of said object in three different spectral ranges and at successive first, second and third intervals, first and second digital to analogue decoders, a first relatively fixed reference voltage coupled to said first decoder, a second reference voltage varying in accordance with the output of said first decoder and coupled to said second decoder, a counter having its output connected to the input of said first decoder only during said first interval by way of a memory circuit and to said second decoder, and comparator means pulsing said counter and responsive to a predetermined difference between said second decoder output and predetermined functions of said Y, X and Z signals respectively whereby the successive outputs of said counter are digital address defining signals corresponding to functions of Y, $X/Y$ and $Z/Y$.

14. An apparatus in accordance with claim 13, including means adding predetermined voltages K1, K2Y and K3Y to said analogue output signals Y, X and Z respectively during said first, second and third intervals.

15. An improved apparatus in accordance with claim 14 wherein said K2Y and K3Y voltages are derived from the output of said first decoder.

16. An improved color analyzing device comprising means defining a window, means directing a beam of light toward said window, a photoelectric cell directed toward said window, a rotating wheel having a plurality of analyzing light filters and a reference filter successively transported across said light beam, a reflector member rotating with said wheel and periodically disposed in registry with said window when said reference filter registers with said light beam, and means automatically periodically regulating the sensitivity of said photoelectric cell when said reference filter and reflector are in registry with said light beam.

17. A color analyzing device in accordance with claim 22 wherein said regulating means includes a variable voltage source connected to said photoelectric cell, an amplifier connected to the output of said photoelectric cell, a reference voltage source, an integrating network, a network having inputs connected to said reference voltage source and to the output of said amplifier to produce a reference signal, switch means periodically feeding said reference signal to said integrating network when said reflector registers with said light beam and means adjusting said variable voltage source in response to the output of said integrating network.

18. An improved color analyzing apparatus comprising means for producing three analogue signals X, Y and Z varying in accordance with the tristimulus values of said color, means translating said analogue signals to digital signals which are functions of X, Y and Z, and classifying means responsive to said digital signals.

19. An improved color analyzing apparatus comprising means for producing three signals X, Y and Z varying in accordance with the tristimulus values of said color and means producing signals which are functions of Y, $X/Y$ and $Z/Y$.

20. The method of classifying a color comprising the steps of determining the tristimulus values X, Y and Z of said color in three respectively different spectral ranges and translating said values to functions of Y, $X/Y$ and $Z/Y$.

21. The method of classifying a color comprising the steps of producing analogue signals corresponding to the tristimulus values of said color X, Y and Z and translating said analogue signals to digital signals which are functions of Y, $X/Y$ and $Z/Y$ respectively.

22. An improved apparatus for distributing articles in accordance with the colors thereof comprising means for producing for each article three first signals X, Y and Z varying in accordance with the tristimulus values of said color, means translating said X, Y and Z signals to a digital address corresponding to $Y+K1$, $X/Y+K2$ and $Z/Y+K3$ wherein K1, K2 and K3 are predetermined increments, a plurality of discharge stations, a discharge ejector located at each of said discharge stations and having different addresses within a predetermined range, a plurality of reject stations, a reject ejector device located at each of said reject stations and responsive to reject signals outside said predetermined range, a conveyor transporting said articles past successive stations and means actuating said ejectors when the address of said article matches the address of the corresponding stations and when the address of the article corresponds to that of the reject station.

23. An apparatus according to claim 22 wherein six reject stations are provided wherein the addresses thereof extend below and above the values respectively of $Y+K1$, $X/Y+K2$ and $Z/Y+K3$.

24. An apparatus according to claim 23 including means for counting the number of actuations of each of the reject ejectors.

25. An apparatus according to claim 22 including means for varying the values of K1, K2 and K3.

References Cited in the file of this patent

UNITED STATES PATENTS

| | | |
|---|---|---|
| 1,626,359 | Rundell | Apr. 26, 1927 |
| 2,228,560 | Cox | Jan. 14, 1941 |
| 2,716,151 | Smith | Aug. 23, 1955 |
| 2,720,811 | Sziklai | Oct. 18, 1955 |
| 2,802,390 | Nimcroff | Aug. 13, 1957 |